United States Patent
Golly (10) Patent No.: US 9,496,907 B2
(45) Date of Patent: Nov. 15, 2016

(54) CIRCUIT ARRANGEMENT FOR PROCESSING A RADIO-FREQUENCY SIGNAL

(75) Inventor: Reinhard Golly, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 586 days.

(21) Appl. No.: 12/239,315

(22) Filed: Sep. 26, 2008

(65) Prior Publication Data

US 2009/0088109 A1    Apr. 2, 2009

(30) Foreign Application Priority Data

Sep. 27, 2007    (DE) .................. 10 2007 046 341

(51) Int. Cl.
*H04B 1/16* (2006.01)
*H04B 1/10* (2006.01)

(52) U.S. Cl.
CPC .......... *H04B 1/1607* (2013.01); *H04B 1/1027* (2013.01)

(58) Field of Classification Search
CPC .. H04B 1/1027; H04B 1/1607; G08G 1/094; H03D 7/163
USPC ..................... 455/76, 260, 147, 78, 205, 73
See application file for complete search history.

(56) References Cited

U.S. PATENT DOCUMENTS

| | | | | |
|---|---|---|---|---|
| 4,063,188 A * | 12/1977 | Mawhinney | .................... | 331/11 |
| 4,932,072 A * | 6/1990 | Toko | ................ | 455/76 |
| 5,668,505 A * | 9/1997 | Vu | ........ | H03G 3/3089 |
| | | | | 331/177 R |
| 5,926,753 A * | 7/1999 | Kobayashi | .......... | H04W 88/022 |
| | | | | 340/7.58 |
| 6,061,385 A * | 5/2000 | Ostman | ........................ | 375/130 |
| 6,463,267 B1 * | 10/2002 | Akamine | ................ | H01L 23/66 |
| | | | | 455/251.1 |
| 6,693,808 B2 | 2/2004 | Myono | | |
| 7,116,566 B2 | 10/2006 | Yang et al. | | |
| 7,200,364 B2 * | 4/2007 | Lim | ....................... | H03B 5/366 |
| | | | | 331/36 R |
| 8,005,443 B1 * | 8/2011 | Levesque | ............... | H04B 17/13 |
| | | | | 455/115.2 |
| 2003/0083025 A1 | 5/2003 | Maruo et al. | | |
| 2005/0046474 A1 * | 3/2005 | Matsumoto | ........... | H03F 1/0227 |
| | | | | 330/10 |
| 2006/0035599 A1 * | 2/2006 | Yoshida et al. | .................. | 455/76 |
| 2006/0181260 A1 * | 8/2006 | Ito | ....................... | H02M 3/1588 |
| | | | | 323/315 |
| 2006/0220631 A1 | 10/2006 | Ito | | |
| 2007/0037533 A1 * | 2/2007 | Bristow | .................... | H03F 1/02 |
| | | | | 455/127.1 |
| 2007/0060070 A1 * | 3/2007 | Rafi | ......................... | H04B 1/40 |
| | | | | 455/76 |
| 2007/0066261 A1 * | 3/2007 | Haralabidis | ........... | H03L 7/1978 |
| | | | | 455/255 |
| 2009/0088109 A1 * | 4/2009 | Golly | .................. | H04B 1/1607 |
| | | | | 455/205 |
| 2010/0141233 A1 * | 6/2010 | Kwok | ........................... | 323/351 |

FOREIGN PATENT DOCUMENTS

| | | |
|---|---|---|
| JP | 6303772 A | 10/1994 |
| JP | 2004194484 | 7/2004 |

* cited by examiner

*Primary Examiner* — Md Talukder (74) *Attorney, Agent, or Firm* — Eschweiler & Associates, LLC (57) ABSTRACT

Described herein is a circuit arrangement for processing a radio-frequency signal.

15 Claims, 4 Drawing Sheets

CIRCUIT ARRANGEMENT FOR PROCESSING A RADIO-FREQUENCY SIGNAL

BACKGROUND

In a mobile terminal having a circuit arrangement, different operating voltages are often used in the circuit arrangement. A main supply voltage source, for example in the form of a battery or a rechargeable battery, which is coupled to the circuit arrangement is usually available. This applies not only to mobile radio telephones but also, for example, to portable computers such as laptops, so-called personal digital assistants (PDA), mobile music players, for example MP3 players, etc.

The power reserve of the mobile terminal is, as a rule, a limited resource. Therefore, it is necessary for the circuit arrangement to be as efficient as possible. In order to ensure efficiency, a switching converter, for example a DC/DC converter, for converting the main supply voltage into the different operating voltages is often used to provide the different operating voltages. Switching frequencies of a few kHz to the MHz range for driving the switching converter are selected depending on the design of the switching converter. The problem of switching frequency components and/or their harmonics occurring, as interference signals, in a useful frequency range of the circuit arrangement or in a specially protected system frequency range therefore arises.

SUMMARY

The present disclosure may be related to providing a circuit arrangement in which interference at a useful frequency of the circuit arrangement, which is caused by the switching frequency, is reduced as far as possible.

The circuit arrangement for processing a radio-frequency signal has a signal processing region which can be supplied with a supply voltage and a frequency signal at a useful frequency. A voltage regulating unit which is intended to provide the supply voltage and can be supplied with a switching signal at a switching frequency is coupled to the signal processing region. A frequency signal supply means which is intended to supply the frequency signal is also coupled to the signal processing region. The frequency signal supply means is coupled, via a divider, to the voltage regulating unit for supplying the switching signal, with the result that the useful frequency is a multiple of the switching frequency.

The switching frequency is thus divided into a subharmonic of the useful frequency, as a result of which the harmonics generated by operation of a voltage regulating unit fall to the useful signal and its harmonic. There is no interference close to the carrier, with the result that crosstalk of the switching signal to the useful frequency is reduced as far as possible. In clear terms, deriving the switching frequency from the useful frequency using a divider inherently results in the harmonics of the interference produced by operation of the voltage regulating unit being synchronized with the useful signal or in a distance between the useful frequency and the interference frequency, which distance is defined by a division factor, the division factor being able to be selected according to the system requirement. The division factor may be an integer or a rational number. Interference, which is caused by operation of the voltage regulating unit, with the signal processing in the signal processing region is thus reduced.

In one development according to the present disclosure, the signal processing region has a useful signal input for supplying a useful signal. The signal processing region comprises a modulator for modulating the useful signal onto the frequency signal. The signal processing region thus essentially ensures signal processing which is determined by the frequency signal. The useful frequency of the frequency signal is thus a characteristic variable for signal processing in the signal processing region. One possible example of such a signal processing region is a radio-frequency modulator, for example for a transmitter of a communication system.

In one development according to the present disclosure, the signal processing region has a received signal input for receiving a received signal. The signal processing region comprises a demodulator for demodulating the received signal from the useful frequency to baseband. One example of such a signal processing region is a radio-frequency demodulator application in a receiver circuit of a communication system.

In one implementation, the signal processing region has a power amplifier.

In one implementation of the present circuit arrangement, the voltage regulating unit comprises a switching regulator. As a result of the use of a switching regulator, the voltage regulating unit has an energy-efficient design.

In another implementation, the voltage regulating unit has a control unit for controlling the switching signal. The control unit can be used, for example, to suppress individual pulses of the switching signal. Stable provision of the supply voltage by the voltage regulating unit can be ensured using the control unit.

In one development of the circuit arrangement, the divider has an adjustable division ratio. It is thus possible to generate a variable switching frequency. Use of a variable switching frequency makes it possible to place the interference signals produced by the switching operations into a frequency range of the signal processing region in such a manner that system requirements can be complied with. This is advantageous, in particular, if the signal processing region is a transmitting or receiving unit.

In one implementation of the circuit arrangement, the latter has a frequency signal generator which is coupled to the frequency signal supply means. The frequency signal is thus already provided in the circuit arrangement, with the result that interference caused by external signals is reduced as far as possible.

In one development, the circuit arrangement has a second frequency signal supply means for supplying a second frequency signal. In this case, the second frequency signal, for example, may likewise be supplied to the signal processing region, with the result that two characteristic frequencies may be present in the signal processing region. In this case, provision may be made of a switching element whose input can be connected to the frequency signal supply means or to the second frequency signal supply means and whose output is coupled to the voltage regulating unit. As a result, the switching frequency can be derived from the first or the second frequency signal in a corresponding manner. The corresponding waveform is influenced by a switching state of the switching element.

In one implementation, the circuit arrangement is arranged in a mobile terminal. In this case, the circuit arrangement may be arranged, in particular, in a transmitter or a receiver of a communication system.

BRIEF DESCRIPTION OF THE DRAWINGS

The detailed description is described with reference to the accompanying figures. In the figures, the left-most digit(s) of a reference number identifies the figure in which the reference number first appears. The same or similar numbers may be used throughout the drawings to reference like features and components.

The disclosure is set forth in more detail below using a plurality of exemplary implementations and with reference to the drawings, in which.

DETAILED DESCRIPTION

Figure 1:
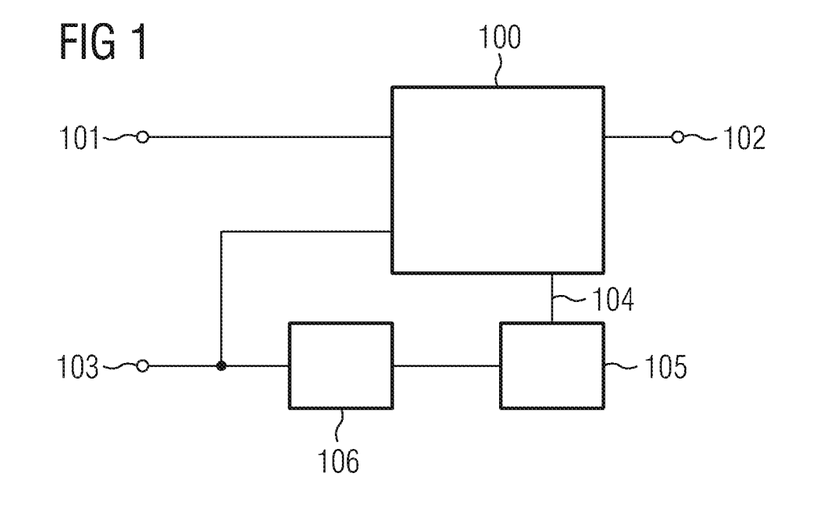
FIG. 1 shows a schematic illustration of one implementation of the circuit arrangement according to the present disclosure.

FIG. 1 shows a schematic illustration of one implementation of the circuit arrangement according to the present disclosure. The circuit arrangement has a signal processing region 100 which is coupled to an input 101 for supplying a useful signal. The signal processing region 100 processes the useful signal provided and uses it to generate an output signal which it provides for further signal processing or for reading out. For this purpose, the signal processing region 100 is coupled to an output 102 for providing the output signal.

Furthermore, the signal processing region 100 is coupled to a frequency signal supply means 103 which is used to provide the signal processing region 100 with a frequency signal at a useful frequency. The frequency signal is required for signal processing in the signal processing region 100. For example, the signal processing region 100 may have a demodulator or a modulator for demodulating or modulating the useful signal onto the frequency signal. It is also conceivable for the signal processing region 100 to have combinational logic and for the frequency signal to be a clock signal in the signal processing region 100.

The signal processing region 100 is supplied with power for signal processing using a supply voltage. This is effected using a supply voltage line 104 which is coupled to the signal processing region 100. The supply voltage line 104 connects the signal processing region 100 to a voltage regulating unit 105. The voltage regulating unit 105 provides the supply voltage.

In the event of the circuit arrangement being arranged in an integrated semiconductor component, the supply voltage is usually between 1 volt and 3 volts. The voltage regulating unit 105 generates the required supply voltage from a main supply voltage having a higher value, for example up to 5 volts. In order to generate the supply voltage, the voltage regulating unit 105 is supplied with a radio-frequency switching signal which is derived from the frequency signal. For this purpose, the voltage regulating unit 105 is connected to the frequency signal supply means 103 via a divider 106. The divider 106 derives the switching signal from the frequency signal. For this purpose, the divider 106 has a division ratio which is, for example, an integer division ratio or a rational division ratio. The division ratio may be selected depending on the application. It is thus conceivable for the division ratio to be selected to be greater than 1. However, if a transmitting apparatus, for example, uses a subharmonic of a frequency signal, division ratios of less than 1, for example 2:9, may also be selected. The divider 106 may have a fixed division ratio or a variably adjustable division ratio.

Figure 2:
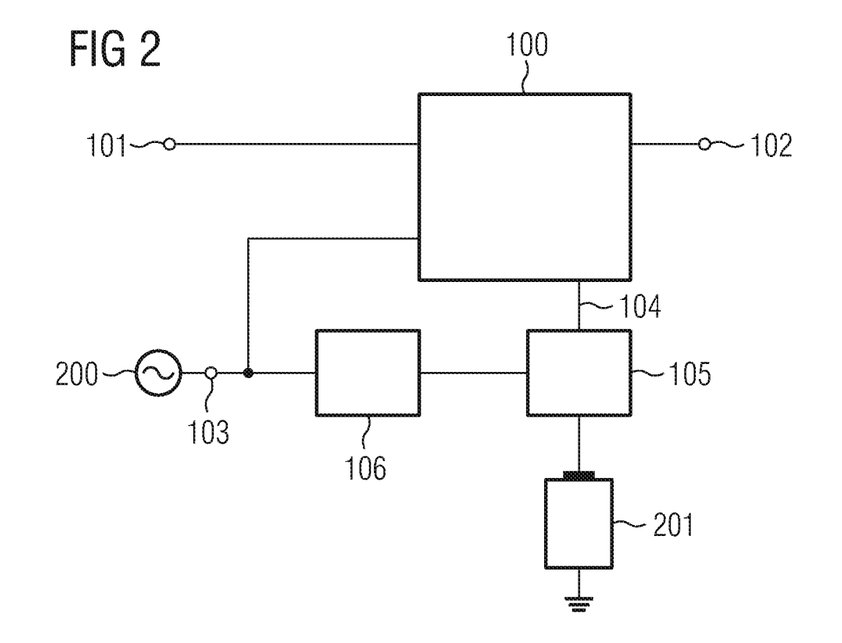
FIG. 2 shows a schematic illustration of another implementation of the circuit arrangement according to the present disclosure.

FIG. 2 shows a schematic illustration of another implementation of the circuit arrangement according to the present disclosure. If use is made of elements which act in an identical manner, or are identical, to those in FIG. 1, the same designations and reference symbols are used. A signal processing region 100 is connected to an input 101 for supplying a useful signal. It is also connected to an output 102 for providing an output signal. In a manner analogous to the possible applications in FIG. 1, the signal processing region 100 generates the output signal from the useful signal. For signal processing, the signal processing region 100 is connected to a frequency signal generator 200 via a frequency signal supply means 103. The frequency signal generator 200 generates the frequency signal having a useful frequency for signal processing in the signal processing region 100. The frequency signal generator 200 may be in the form of, for example, a voltage-controlled oscillator (VCO), a phase-locked loop (PLL) or a crystal oscillator.

The frequency signal generator 200 is connected to a voltage regulating unit 105 via the frequency signal supply means 103 and a divider 106 in order to provide said voltage regulating unit 105 with a switching signal. The voltage regulating unit 105 is connected to the signal processing region 100 via a supply voltage line 104 in order to provide said signal processing region 100 with a supply voltage. The supply voltage of the signal processing region 100 is provided by the voltage regulating unit 105 from a main supply voltage. In the exemplary implementation shown, the main supply voltage is provided by a main supply voltage source 201, for example in the form of a battery or a rechargeable battery 201, which is coupled to the voltage regulating unit 105.

Figure 3:
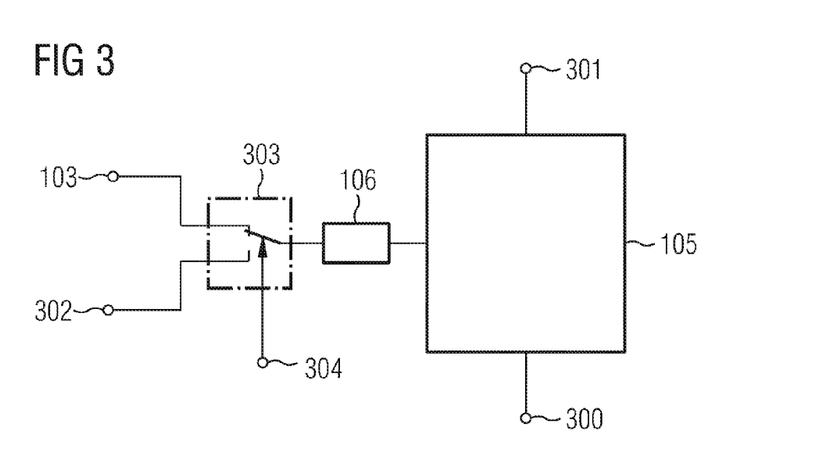
FIG. 3 shows a schematic illustration of a section of one implementation of the circuit arrangement according to the present disclosure.

FIG. 3 shows the schematic illustration of a section of one implementation of the circuit arrangement according to the present disclosure. The circuit arrangement has a voltage regulating unit 105 which is coupled to a main voltage supply means 300. A main supply voltage is supplied to the voltage regulating unit 105 via the main voltage supply means 300. The voltage regulating unit 105 uses the main supply voltage to generate a supply voltage which it provides at a supply voltage connection 301. For this purpose, the voltage regulating unit 105 is coupled to the supply voltage connection 301. The voltage regulating unit 105 generates the supply voltage on the basis of a switching signal which is supplied by a divider 106. The output of the divider 106 is coupled to the voltage regulating unit 105 and the input of the divider 106 is coupled to a switching element 303. The switching element 303 is coupled to a frequency signal supply means 103 and to a second frequency signal supply means 302.

Furthermore, the switching element 303 is coupled to an operating control signal supply means 304. A switching state of the switching element 303 is set using an operating control signal provided at the operating control signal supply means 304. In a first switching state of the switching element 303, the latter couples the frequency signal supply means 103 to the divider 106. The switching signal which is supplied to the voltage regulating unit 105 is accordingly derived from a frequency signal which is provided at the frequency signal supply means 103.

In a second switching state of the switching element 303, the latter couples the second frequency signal supply means 302 to the divider 106. The switching signal which is supplied to the voltage regulating unit 105 is accordingly derived from a frequency signal which is supplied to the second frequency signal supply means 302.

Figure 4:
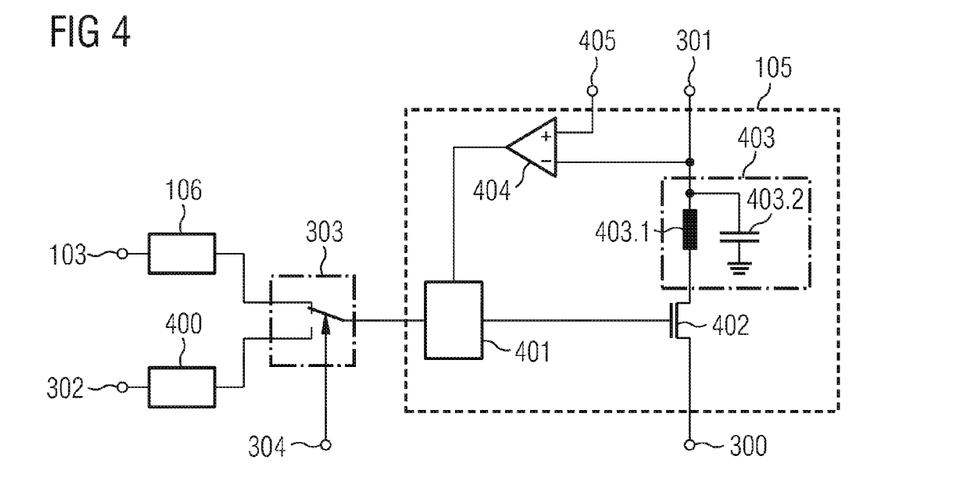
FIG. 4 shows a schematic illustration of a section of one implementation of the circuit arrangement according to the present disclosure.

FIG. 4 shows the schematic illustration of a section of one implementation of the circuit arrangement according to the present disclosure. In a manner analogous to the implementation shown in FIG. 3, a voltage regulating unit 105 (illustrated using dotted lines) is connected to a main voltage supply means 300 and to a supply voltage connection 301. The voltage regulating unit 105 generates a supply voltage from a main supply voltage provided at the main voltage supply means 300 and provides the supply voltage at the supply voltage connection 301.

The supply voltage is generated on the basis of a switching signal which is made available to the voltage regulating unit 105 by a switching element 303 (illustrated using dashed lines). The switching element 303 is connected, via a divider 106, to a frequency signal supply means 103 for receiving a frequency signal. The switching element 303 is also connected, via a second divider 400, to a second frequency signal supply means 302 for receiving a second frequency signal. The switching element 303 is finally connected to a third control signal supply means 304. An operating control signal which is used to set a switching state of the switching element 303 is provided at the operating control signal supply means 304. In a first switching state, the switching element 303 connects the voltage regulating unit 105 to the divider 106, with the result that a signal which is derived from the frequency signal is provided as the switching signal. In a second switching state, the switching element 303 connects the voltage regulating unit 105 to the second divider 400, with the result that a signal which is derived from the second frequency signal is provided as the switching signal. The switching element 303 is connected to a control unit 401 which is provided in the voltage regulating unit 105. The control unit 401 may be a PWM generator which generates a pulse-width-modulated signal. The level of the pulse-width-modulated signal can be set using the control unit 401. It is likewise conceivable for the control unit 401 to comprise an accumulator or other logic units.

The control unit 401 leads the switching signal to a switching transistor 402, a first connection of which is coupled to the main voltage supply means 300. A second connection of the switching transistor 402 is connected to a low-pass element 403. The switching transistor 402 is connected to the supply voltage connection 301 via its connection and via the low-pass element 403.

The switching transistor 402 connects the main voltage supply means 300 to the low-pass element 403 on the basis of the switching signal. The low-pass element 403 has an inductance 403.1 which is connected to earth via a capacitance 403.2. Furthermore, the inductance 403.1 is coupled to the supply voltage connection 301. An output signal from the low-pass element 403 is supplied to a comparator 404. The input of the comparator 404 is also coupled to a reference voltage supply means 405. In this manner, the comparator 404 can compare the supply voltage, which is provided at the supply voltage connection 301, with a reference voltage which is provided at the reference voltage supply means 405. The comparison signal is supplied to the control unit 401 by the comparator 404. In this manner, the control unit 401 can influence the switching signal if the supply voltage differs from the reference voltage.

In the implementation shown, the switching transistor 402 is illustrated using a field effect transistor. It can be produced, for example, using a known CMOS process. It is likewise conceivable for the switching transistor 402 to be in the form of a bipolar transistor. It is also conceivable for the voltage regulating unit 105 to be constructed using another technology, in the form of a silicon-based semiconductor or using discrete components.

Figure 5:
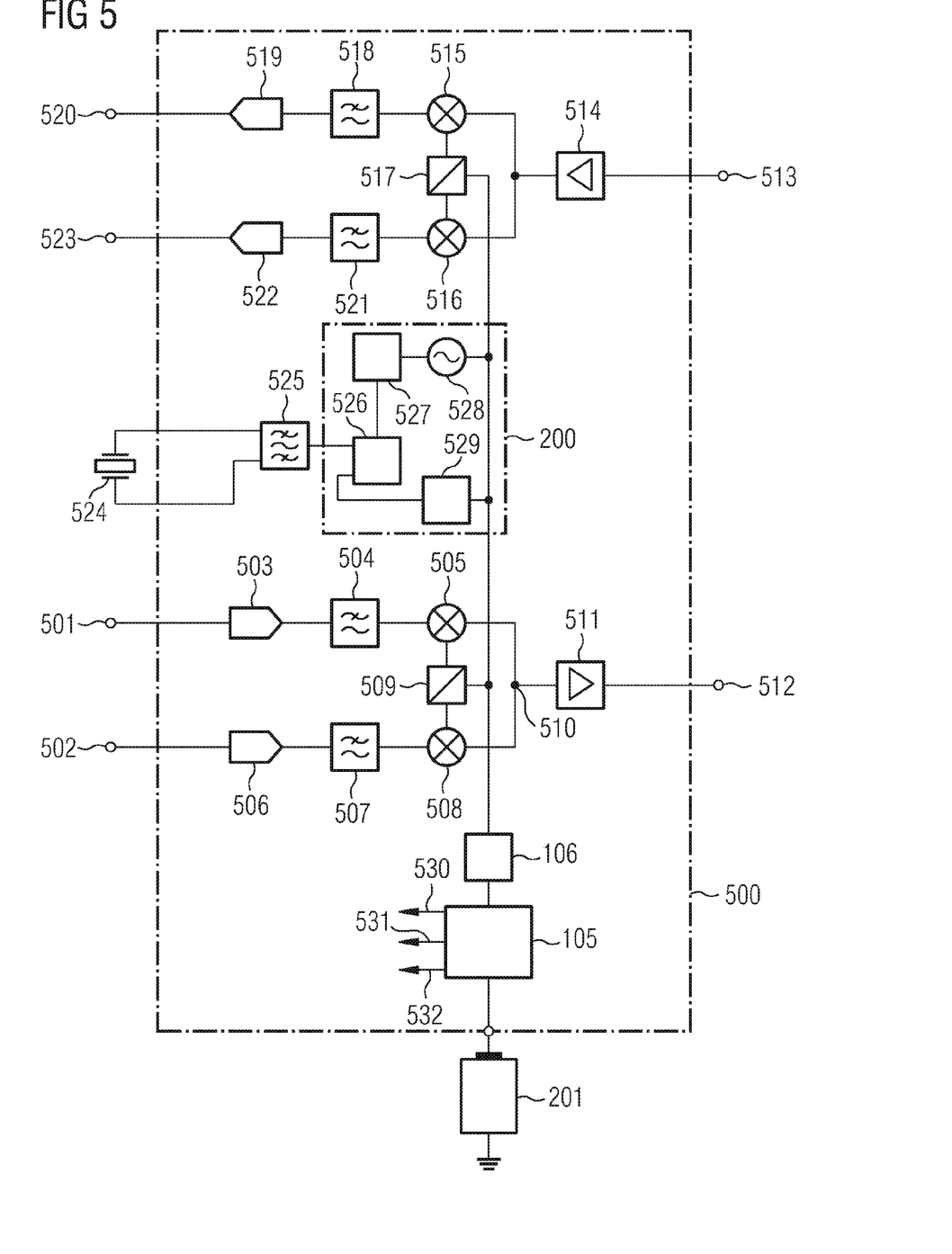
FIG. 5 shows a schematic illustration of a transceiver implementation of the circuit arrangement according to the present disclosure.

FIG. 5 shows a schematic illustration of a transceiver implementation of the circuit arrangement according to the present disclosure. A transmitting/receiving circuit 500 (illustrated using dashed lines) having a transmitting path and a receiving path is illustrated. The transmitting path has a first input 501 and a second input 502. The first input 501 is connected to a low-pass filter 504 via a first digital/analogue converter 503. The low-pass filter 504 is connected to a first mixer 505. The second input 502 is connected to a second low-pass filter 507 via a second digital/analogue converter 506. The second low-pass filter 507 is connected to a second mixer 508. The first mixer 505 and the second mixer 508 are each connected to outputs of a phase shifter 509. The phase shifter 509 is connected, for its part, to a frequency generator 200 (illustrated using dashed lines). The latter is supplied with a frequency signal, which corresponds to a carrier frequency of the transmitting path, by the frequency generator 200. The frequency signal is shifted by a phase of 90° in the second mixer 508 and is immediately supplied to the first mixer 505. The outputs of the first mixer 505 and the second mixer 508 are connected to a node 510. The node 510 is connected to a signal output 512 via an amplifier 511. The transmitting path shown represents a so-called IQ modulator or a Cartesian modulator which uses Cartesian baseband signals, which are provided at the first input 501 and at the second input 502, to generate an output signal which is modulated onto a carrier frequency.

Whereas a Cartesian modulator is shown in the exemplary implementation, it would likewise be conceivable for other forms of modulation, for example a polar modulator, to be provided in the circuit arrangement. The transmitting path is part of a signal processing region of the transmitting/receiving apparatus 500. The transmitting/receiving apparatus 500 also has a receiving path which, for its part, has a signal input 513 which is connected to an input amplifier 514, for example a low noise amplifier (or LNA). The output of the input amplifier 514 is connected to inputs of a third mixer 515 and a fourth mixer 516. The third mixer 515 and the fourth mixer 516 are connected to a second phase shifter 517 which, for its part, is connected to the frequency generator 200. The output of the third mixer 515 is connected to a first baseband output 520 via a third low-pass filter 518 and a first analogue/digital converter 519. The output of the fourth mixer 516 is connected to a second baseband output 523 via a fourth low-pass filter 521 and a second analogue/digital converter 522.

The receiving path is a so-called Cartesian demodulator which demodulates a received signal around a carrier frequency, which is provided by the frequency generator 200, to a baseband signal. It would likewise be conceivable for other types of demodulation or demodulation architectures to be provided in the circuit arrangement.

The frequency signal generator 200 has the structure of a phase-locked loop. In order to provide a stable frequency signal, provision is made of an external crystal oscillator 524 which is connected to the frequency generator 200 via a bandpass filter 525. A reference signal which can be used by the frequency signal generator 200 to generate a stable frequency signal is provided at the output of the bandpass filter 525. For this purpose, the frequency signal generator 200 has the structure of a phase-locked loop. The frequency signal provided by the bandpass filter 525 is fed into a phase detector 526, a feedback signal additionally being fed into the phase detector. The phase detector 526 uses the comparison of the phases of the feedback signal and the reference signal to generate an output signal which is supplied to a voltage-controlled oscillator 528 via a loop filter 527. On the basis of the voltage signal generated by the loop filter 527, the voltage-controlled oscillator 528 generates an output signal which corresponds to the frequency signal of the frequency signal generator 200. The signal is applied to a divider 529 which uses it to generate the feedback signal. The division ratio selected by the divider 529 may be an integer but may also be another number, for example a rational number. The reference signal generated by the crystal or generated with the aid of the crystal is thus used to generate a frequency signal which is in a rational or integer ratio to the crystal signal.

The frequency signal is supplied to the first phase shifter 509 and to the second phase shifter 517, the respective useful frequency being able to be set in a variable manner by the divider 529 depending on transmitting or receiving operation. The frequency signal generated by the frequency signal generator 200 is also passed, via a divider 106, to a voltage regulating unit 105. In this case, the divider 106 generates a switching signal from the frequency signal. The switching signal and the frequency signal are in an integer or rational ratio to one another. The voltage regulating unit 105 is coupled to a battery or a rechargeable battery 201. The voltage regulating unit 105 uses the main supply voltage potential provided by the battery 201 to generate supply voltages which are provided at different switching nodes 530 to 532 for further use in the transmitting/receiving apparatus 500. Internal voltages of 1.5 volts, 2.7 volts or other values may thus be provided from a main supply voltage of approximately 5 volts, for example. It is also conceivable to provide the same voltage values for different circuit regions in the transmitting/receiving apparatus 500. In this case, the voltage regulating unit 105 may comprise switching regulators, for example a DC/DC converter. It is likewise conceivable for the voltage regulating unit 105 to comprise a plurality of switching regulators or linear regulators or a combination of switching and linear regulators.

Figure 6:
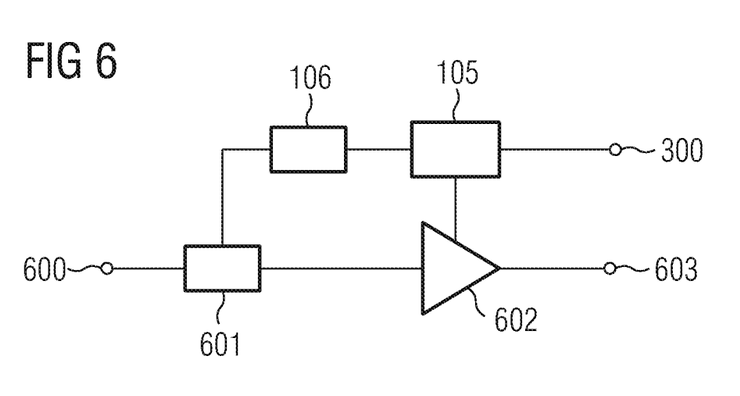
FIG. 6 shows a schematic illustration of a power amplifier implementation of the circuit arrangement according to the present disclosure.

FIG. 6 shows a power amplifier implementation of the circuit arrangement according to the present disclosure. It has an input 600 for supplying a frequency signal which is at a particular useful frequency and may also be phase-modulated in this case. The frequency signal is supplied from the input 600 to a power divider 601 which, for its part, is coupled to the input of a power amplifier 602. The power divider 601 is also connected to a voltage regulating unit 105 via a divider 106. The voltage regulating unit 105 is coupled to a main supply voltage connection 300 and uses a main supply voltage potential provided at the latter to generate a supply voltage which is supplied to the power amplifier 602. The supply voltage which is provided by the voltage regulating unit 105 is used, for example, to set a gain factor or an operating point of the power amplifier 602. The output of the power amplifier 602 is connected to a signal output 603. The amplified frequency signal is provided at the output 603.

I claim:

1. A circuit arrangement for processing a radio-frequency signal comprising:
   a signal processing circuit comprising a modulator circuit or a demodulator circuit configured to receive a regulated supply voltage that provides a supply power to the modulator circuit or the demodulator circuit for operation thereof, and a frequency signal at a useful frequency;
   a voltage regulating circuit coupled to the signal processing circuit and configured to receive a supply voltage and a switching signal at a switching frequency and generate the regulated supply voltage based on the supply voltage and the switching signal, the voltage regulating circuit comprising a switching regulator comprising a switch driven by a pulse width modulation signal having a pulse width that is a function of the switching signal, and wherein a value of the regulated supply voltage is based on the pulse width of the pulse width modulation signal;
      wherein the voltage regulating circuit is configured to regulate a magnitude of the regulated supply voltage;
   a frequency signal generator coupled to the signal processing circuit and configured to generate the frequency signal; and
   a divider configured to receive the frequency signal from the frequency signal generator and generate the switching signal based thereon, wherein the useful frequency is a multiple of the switching frequency.

2. The circuit arrangement according to claim 1, the voltage regulating circuit comprising a control unit configured to generate the pulse width modulation signal based on the switching signal.

3. The circuit arrangement according to claim 1, the divider having an adjustable division ratio.

4. The circuit arrangement according to claim 1, further comprising a second frequency signal generator configured to supply a second frequency signal.

5. The circuit arrangement according to claim 4, further comprising a switching element whose input is connected to the frequency signal supply unit or to the second frequency signal supply unit and whose output is coupled to the voltage regulating circuit.

6. The circuit arrangement according to claim 1, wherein the circuit arrangement resides in a mobile terminal.

7. The circuit arrangement according to claim 1, wherein the circuit arrangement resides in a transmitter.

8. The circuit arrangement according to claim 1, wherein the circuit arrangement resides in a receiver.

9. A transceiver comprising:
   a voltage regulating circuit having an input coupled directly to an output of a divider and configured to couple to a voltage source, the voltage regulating circuit configured to generate one or more regulated supply voltages based on the voltage source when coupled thereto and a switching signal received from the divider, the voltage regulating circuit comprising a switching regulator comprising a switch driven by a pulse width modulation signal having a pulse width that is a function of the switching signal, and wherein a value of the regulated supply voltage is based on the pulse width of the pulse width modulation signal; and
      wherein the voltage regulating circuit is configured to regulate a magnitude of the regulated supply voltage;
   a frequency signal generator coupled to the divider and configured to generate a frequency signal that is provided to the divider, the frequency signal having a useful frequency for processing in a signal processing region of the transceiver.

10. The transceiver according to claim 9, further comprising a phase shifter of a transmitting path, the phase shifter being coupled to the frequency signal generator and configured to receive the frequency signal from the frequency signal generator.

11. The transceiver according to claim 9, further comprising a phase shifter of a receiving path, the phase shifter being coupled to the frequency signal generator and configured to receive the frequency signal from the frequency signal generator.

12. The transceiver according to claim 9, further comprising an additional divider coupled to the voltage regulating circuit, the additional divider being configured to provide an additional frequency signal to the voltage regulating circuit, wherein the additional frequency signal has a different frequency than the frequency signal.

13. The transceiver according to claim 9, wherein the voltage regulating circuit comprises a comparator that is configured to compare a particular supply voltage generated by the voltage regulating circuit with a reference voltage and provide a signal indicating the comparison between the particular supply voltage and the reference voltage to a control unit of the voltage regulating circuit.

14. The transceiver according to claim 9, wherein the frequency signal generator comprises a phase-locked loop.

15. A device comprising:
   a power divider coupled to a power amplifier and to a divider, the power divider being configured to receive a frequency signal and provide the frequency signal to the power amplifier and the divider; and
   a voltage regulating circuit coupled to the divider and the power amplifier, wherein the voltage regulating circuit is configured to receive a supply voltage and a switching signal from the divider and provide a regulated supply voltage to the power amplifier based on the supply voltage and the switching signal, wherein the regulated supply voltage provides power to the power amplifier for operation thereof, the voltage regulating circuit comprising a switching regulator comprising a switch driven by a pulse width modulation signal having a pulse width that is a function of the switching signal, and wherein a value of the regulated supply voltage is based on the pulse width of the pulse width modulation signal;
   wherein the voltage regulating circuit is configured to regulate a magnitude of the regulated supply voltage.

* * * * *

UNITED STATES PATENT AND TRADEMARK OFFICE
CERTIFICATE OF CORRECTION

PATENT NO. : 9,496,907 B2
APPLICATION NO. : 12/239315
DATED : November 15, 2016
INVENTOR(S) : Reinhard Golly Page 1 of 1

It is certified that error appears in the above-identified patent and that said Letters Patent is hereby corrected as shown below:

On the Title Page

Foreign Application Priority Data (30), please replace "10 2007 046 341" with "10 2007 046 341.5"

Signed and Sealed this
Twenty-eighth Day of March, 2017

Michelle K. Lee
*Director of the United States Patent and Trademark Office*